Oct. 17, 1939.　　　J. C. RICHARDSON　　　2,176,823
VENDING MACHINE
Filed Aug. 19, 1936　　　9 Sheets-Sheet 1
FIG. 2.
FIG. 1.
FIG. 3.
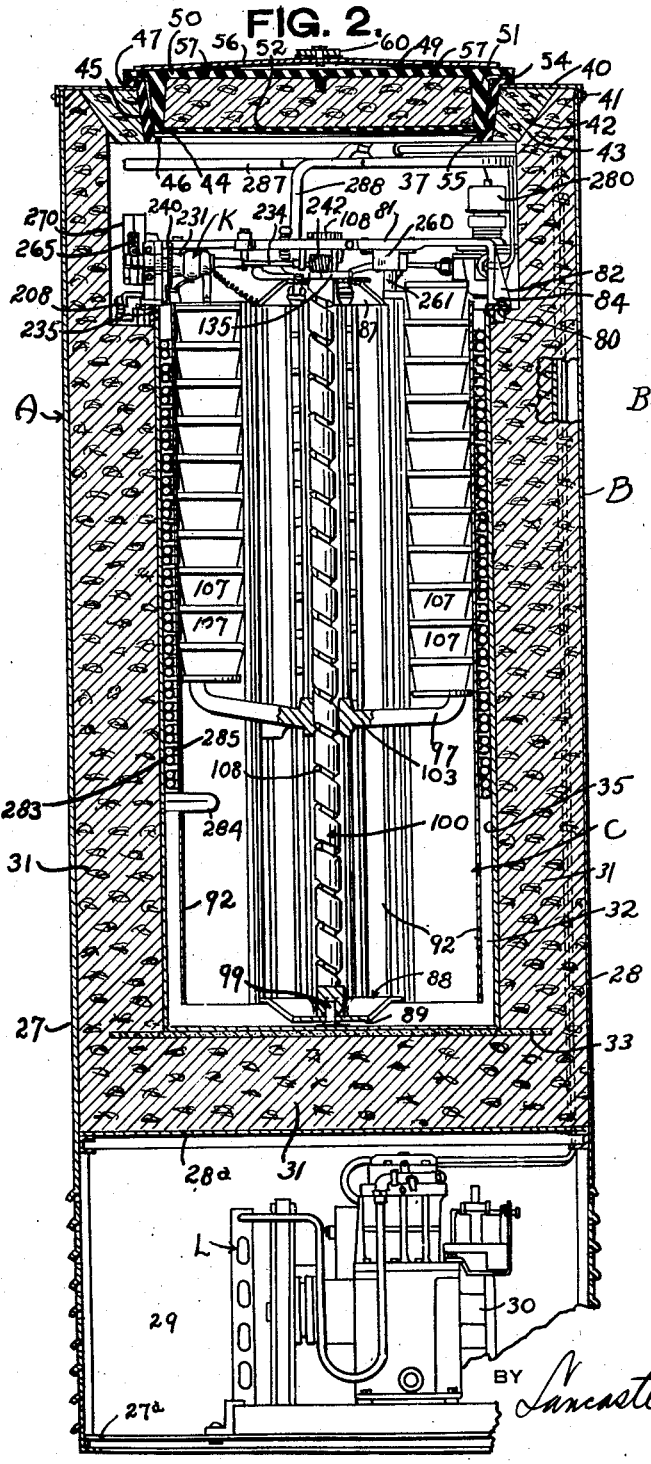
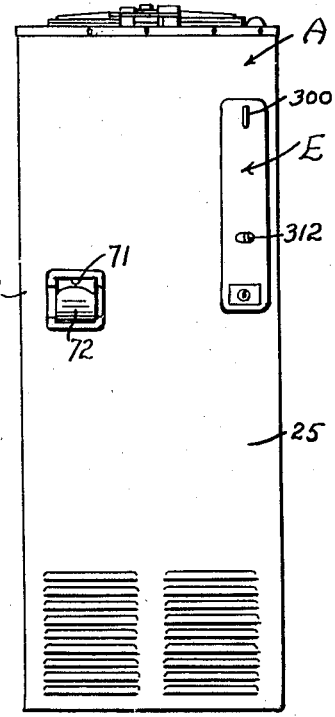
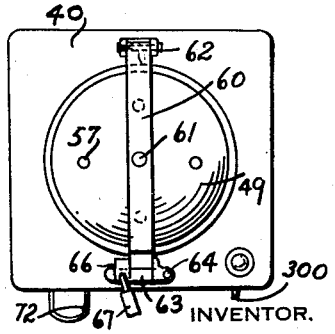
INVENTOR.
James C. Richardson
BY Lancaster, Allwine and Rommel
ATTORNEYS.

Oct. 17, 1939.　　　J. C. RICHARDSON　　　2,176,823
VENDING MACHINE
Filed Aug. 19, 1936　　　9 Sheets-Sheet 2

INVENTOR.
James C. Richardson

BY Lancaster, Allwine and Rommel
ATTORNEYS.

Oct. 17, 1939.　　J. C. RICHARDSON　　2,176,823
VENDING MACHINE
Filed Aug. 19, 1936　　9 Sheets-Sheet 3

INVENTOR.
James C. Richardson

BY Lancaster, Allwine and Rommel
ATTORNEYS.

Oct. 17, 1939.　　　J. C. RICHARDSON　　　2,176,823
VENDING MACHINE
Filed Aug. 19, 1936　　　9 Sheets-Sheet 4

INVENTOR.
James C. Richardson
BY Lancaster, Allwine and Rommel
ATTORNEYS.

Oct. 17, 1939. J. C. RICHARDSON 2,176,823
VENDING MACHINE
Filed Aug. 19, 1936 9 Sheets-Sheet 5

INVENTOR.
James C. Richardson
BY Lancaster, Allwine Rommel
ATTORNEYS.

Oct. 17, 1939.    J. C. RICHARDSON    2,176,823
VENDING MACHINE
Filed Aug. 19, 1936    9 Sheets-Sheet 6
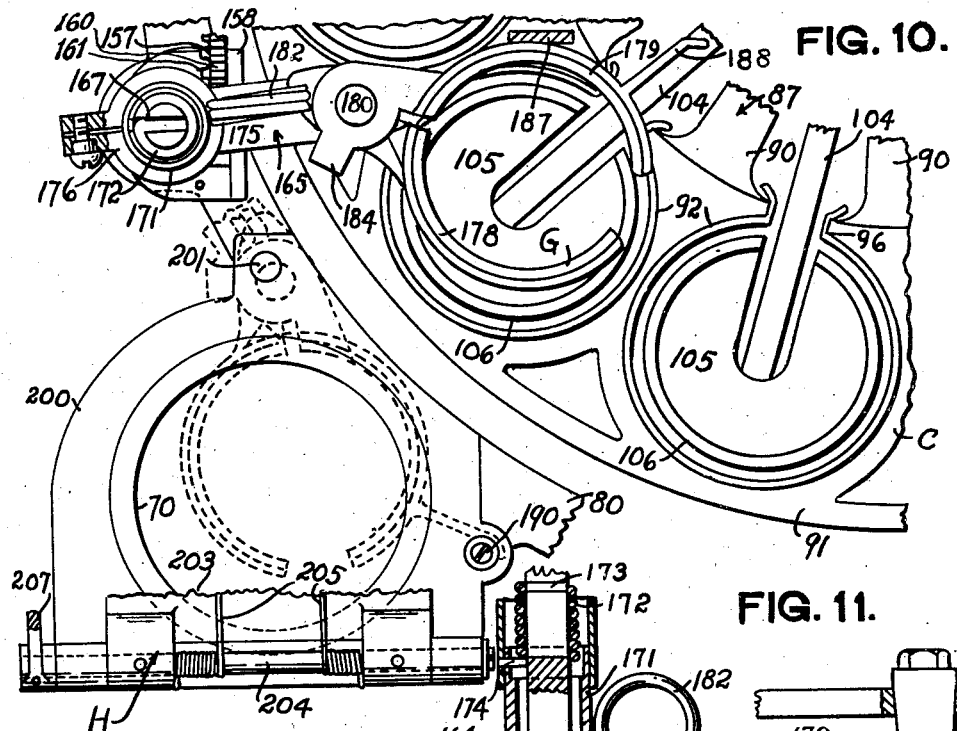
FIG. 10.
FIG. 11.
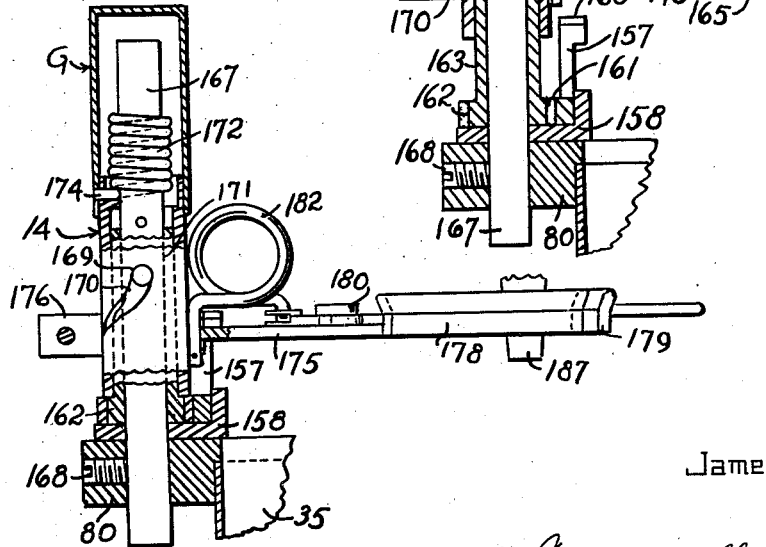
FIG. 12.
INVENTOR.
James C. Richardson
BY Lancaster, Allwine and Rommel
ATTORNEYS.

Oct. 17, 1939.   J. C. RICHARDSON   2,176,823
VENDING MACHINE
Filed Aug. 19, 1936   9 Sheets-Sheet 7

INVENTOR.
James C. Richardson
BY Lancaster, Allwine and Rommel
ATTORNEYS.

Oct. 17, 1939.                    J. C. RICHARDSON                    2,176,823
                                   VENDING MACHINE
                             Filed Aug. 19, 1936          9 Sheets-Sheet 8
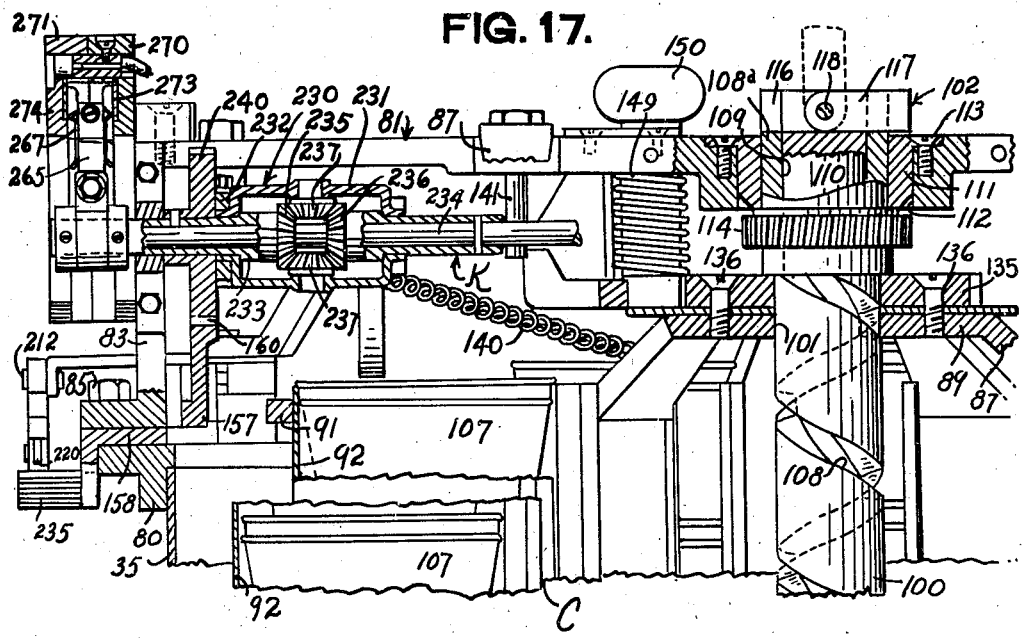
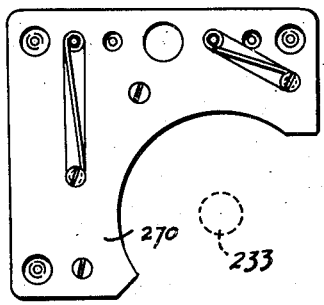
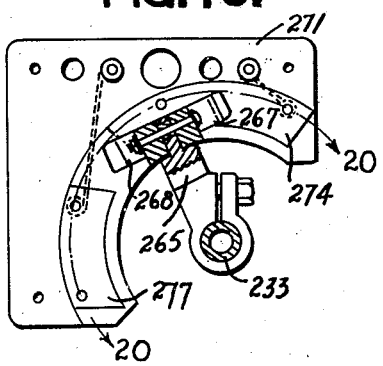
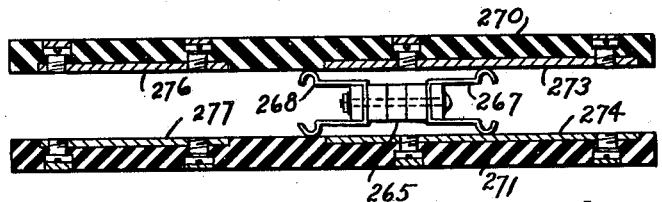
INVENTOR.
James C. Richardson
BY
ATTORNEYS.

Oct. 17, 1939.   J. C. RICHARDSON   2,176,823
VENDING MACHINE
Filed Aug. 19, 1936   9 Sheets-Sheet 9

INVENTOR.
James C. Richardson
BY
ATTORNEYS.

Patented Oct. 17, 1939

2,176,823

UNITED STATES PATENT OFFICE 2,176,823

VENDING MACHINE

James Columbus Richardson, Brooklyn, N. Y., assignor to The Fischman Company, Philadelphia, Pa., a corporation Application August 19, 1936, Serial No. 96,874

8 Claims. (Cl. 312—36)

This invention relates to improvements in vending machines.

The primary object of this invention is the provision of an improved vending machine for the coin controlled dispensing of refrigerated articles, such as packaged ice-cream, although the generic features of the invention are applicable to vending machines for dispensing any commodity.

A further and important object of this invention is the provision of an improved vending machine from which refrigerated articles are dispensed from a location adjacent the top of the refrigerated compartment, in order to prevent loss of refrigeration incidental to the dispensing operation; the improved machine of the present invention embodying a more economical assemblage of compacted parts which will enable a refrigerated commodity to be automatically dispensed to an operator merely as the result of insertion of a predetermined coin.

A further object of this invention is the provision of an improved vending machine which is electrically operated and includes a motor automatically set into actuation for dispensing an article through an improved coin control mechanism set forth in a co-pending application Serial No. 96,867 filed August 19, 1936 bearing Patent Number 2,144,568 granted January 17, 1939.

A further object of this invention is the provision of an improved article carrier for the magazine stacking of articles intended to be dispensed from a vending machine.

A further object of this invention is the provision of improved means for dispensing articles from vending machines from the top of a stacked series of the articles.

A further object of this invention is the provision of an improved vending machine intended to dispense articles which may vary somewhat as to size; the improved machine having a dispensing mechanism and compensating means associated therewith to permit the article to be properly presented and acted upon by the dispensing mechanism.

A further object of this invention is the provision of an improved motor controlled dispensing machine.

A further object of this invention is the provision of improved means to intermittently advance a rotatable article carrier of a vending machine to dispensing position.

A further object of this invention is the provision of improved refrigerating means for vending machines intended to dispense refrigerated articles, such as ice-cream.

Other objects and advantages of this invention will be apparent during the course of the following detailed description.

In the accompanying drawings, forming a part of this specification, and wherein similar reference characters designate corresponding parts throughout the several views, Figure 1 is a front elevation of the improved vending machine showing more particularly the casing with the pocket into which the refrigerated article is dispensed, and an improved coin control mechanism which has been made the subject matter of the above mentioned co-pending application.

Figure 2 is a fragmentary vertical sectional view taken through the improved vending machine.

Figure 3 is a plan view of the improved vending machine.

Figure 10 is an enlarged view showing the article dispensing tongs in the position shown in Figure 4.

Figure 11 is a vertical sectional view taken through the mounting construction of the article gripping and dispensing tongs showing the elevated position of the gripping tongs.

Figure 12 is a view of the structure shown in Figure 11, but with the gripping tongs lowered as a preliminary to the gripping of an article in order to elevate the latter off the adjacent article for bringing it to a dispensing position.

Figure 17 is a sectional view taken through the motor controlled carrier actuating mechanism, showing certain mounting details at the upper end of the carrier, and also showing a motor controlled switch arm and package size compensating means.

Figures 18 and 19 are views showing the inside construction of the two valves of an insulation block and motor controlled switch arm construction.

Figure 20 is a sectional view taken through the switch construction, substantially on the line 20—20 of Figure 19.

Figure 4:
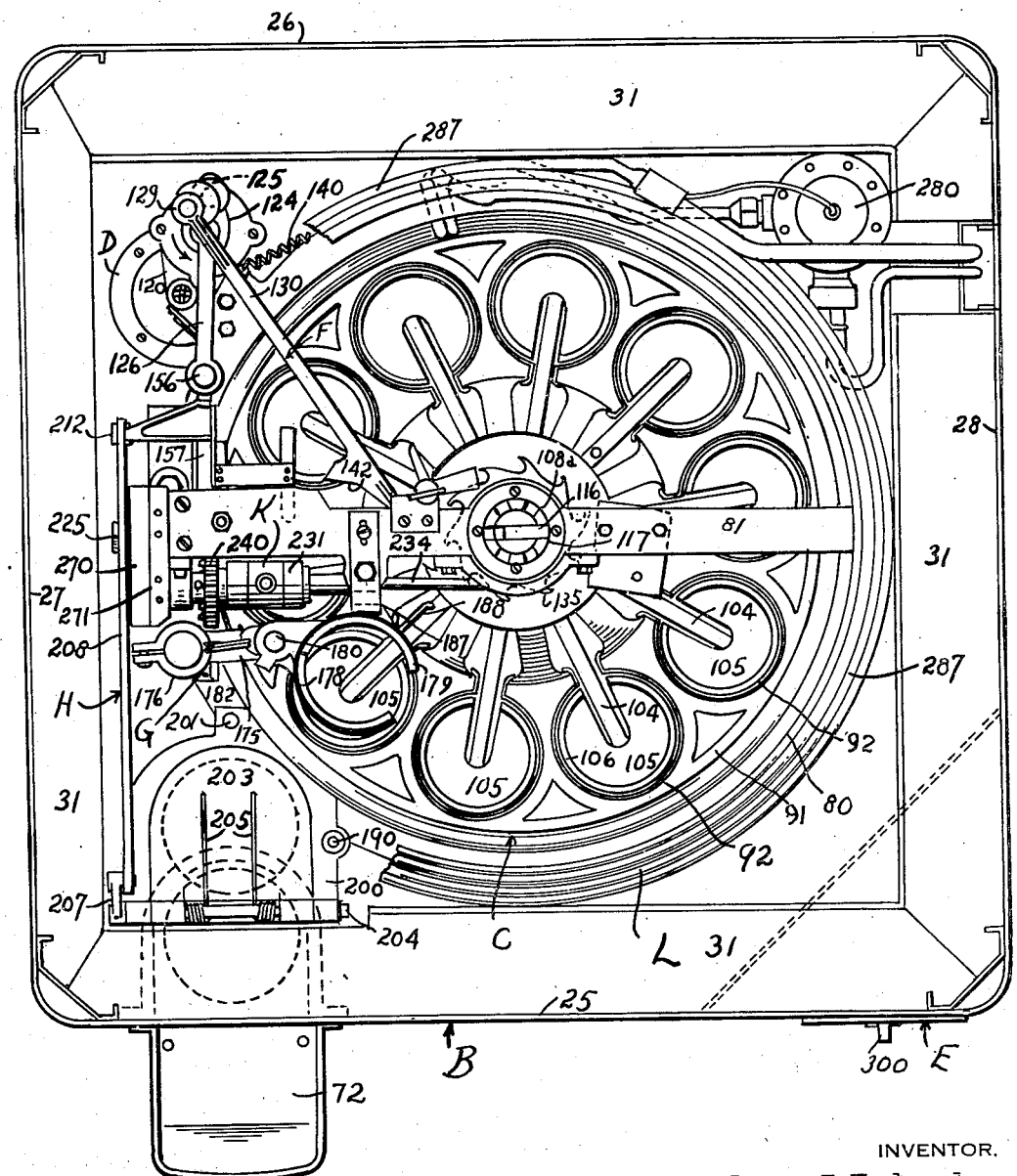
Figure 4 is a plan view of the improved vending machine showing the top wall thereof removed and the motor, carrier, and dispensing tongs in position to complete the dispensing of an article (not shown); the tongs being shown in their article gripping position just prior to movement of the same to the dispensing position.

In the drawings, wherein for the purpose of illustration is shown only a preferred embodiment of the invention, the letter A may generally designate the vending machine, which may include an insulated casing B; article carrier C; a motor D; a coin controlled means E for actuating the motor D; means F connected with the motor to intermittently advance the carrier C; means G connected with the motor to move the articles as they are presented by the carrier to ejecting position with respect to a dispensing chute; motor control closure means H cooperating with the means G to permit the article to be dispensed from the machine without appreciable loss of refrigeration; compensating means K to permit the stacked articles to be properly brought to dispensing position notwithstanding variations in height of the articles, and refrigerating means L for cooling the compartment wherein the stacked articles are maintained in the vending machine.

Referring to the casing B which houses the vending machine, the same preferably comprises upstanding front and rear walls 25 and 26, opposite side walls 27 and 28, a bottom wall construction 27ª and a metal partition wall 28ª spaced from the bottom wall 27ª to provide a lower compartment 29 wherein the refrigeration unit 30 of the refrigerating means L is disposed. All of these walls are preferably of metal, and the walls facing the compartment 29 may be provided with usual vents to aerate the compartment 29. At the inner sides of the walls 25 to 28 inclusive, and above the partition wall 28ª thick layers of insulation 31 are provided, preferably of cork, defining an insulated compartment 32 wherein the carrier is rotatably mounted. At the bottom of the compartment 32 there is an insulation floor 33, preferably of slate or like material, but the compartment 32 is unlined. A tank 35 is positioned in the compartment 32 but terminates short of the upper laterally enlarged chamber 37 in the top of the casing B; this chamber 37 being laterally enlarged to receive the vending machine operating mechanism.

Figure 5:
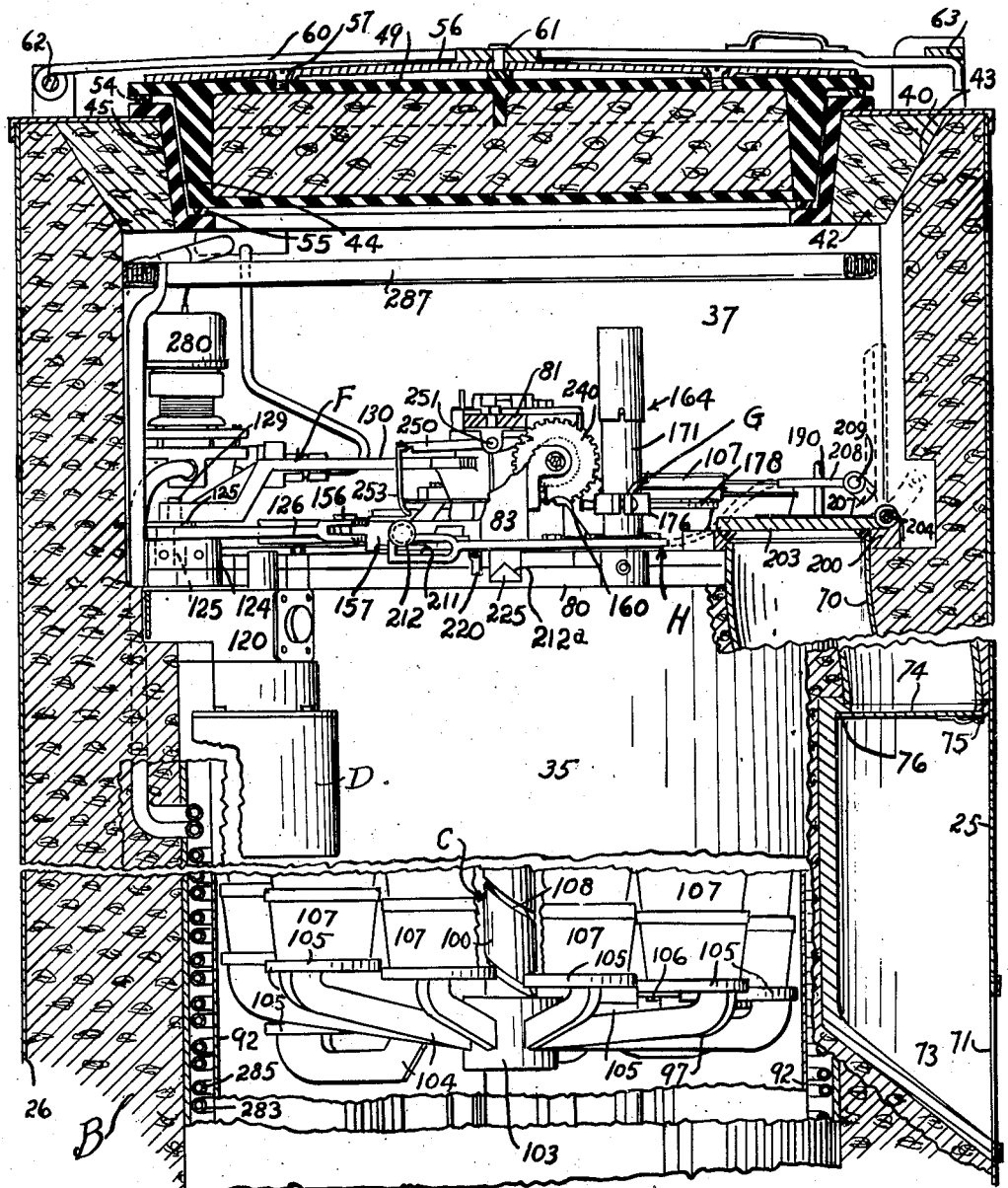
Figure 5 is a fragmentary vertical sectional view taken through the upper portion of the vending machine, showing more particularly the elevator on which the refrigerated articles are carried in stacked columns, and showing the motor controlled structure of the machine and the dispensing chute.

The refrigerated compartment of the casing B is provided with a removable top wall 40 which may be screwed or secured at 41 to the front, rear, and side walls of the casing; the same thereBeneath having marginal insulation 42 with a bevel fit 43 against the top of the side wall insulation. This top wall 40 is provided with an opening 44 therethrough by means of which access may be had to the interior of the refrigerated compartment for refill and other purposes. This opening 44 is peripherally lined with an insulation collar 45 which may be of hard rubber or synthetic material; the same including a lower horizontal closure seating flange 46 and an upper horizontal flange 47 overlying the top wall 40. An improved closure 49 is provided for sealing this opening 40, the same being of insulation and including a top wall 50 with a depending flange 51; the latter having an insulation partition 52 at the lower end thereof, providing with the wall 50 a hollow insulated body out of the closure. The closure 49 is provided with gaskets 54 and 55 for sealing engagement between the closure and the flanges 47 and 46 respectively, above mentioned. All of these parts of the closure are preferably of insulation, but it is provided with a metallic convexly shaped cap 56 secured at 57 to the top wall 50. This cap centrally thereof has a resilient metal arm 60, in the shape of a bar, riveted centrally thereto at 61. One free end of the bar 60 is pivotally mounted at 62 (Figure 3 of the drawings) to the top wall of the casing, so that the closure 49 may be swung on the pivot 62 and entirely removed from the opening 44 to have access to the interior of the casing B. These features are shown in both Figures 3 and 5 of the drawings. The bar at its opposite end may be clamped upon the top wall by means of a lever 63 pivoted at 64 on the top wall; the latter being movable into engagement beneath a keeper 66, to which it may be detachably connected by means of a suitable lock 67. In this position the bar 60 is tensioned, as shown in Figure 5 in order to force the closure into sealing engagement with the gaskets seated against the collar 45, as above mentioned. This provides a very durable yet efficient and easily operated means for mounting the closure.

The casing B is provided with a dispensing chute 70 mounted in the insulation material of the front wall structure. It has an opening at its upper end into the refrigerated compartment 32 in facing relation near the bottom of the enlarged portion 37 of the compartment; the chute 70 being of insulating material and curving or sloping downwardly to an outlet opening 71 in the front wall 25, shown in Figure 5 of the drawings. The front wall 25 is provided with a pocket or receptacle 72 to catch the dispensed article as it passes through the opening 71. In facing relation with the opening 71 the chute 70 is provided with a floor 73 sloped to discharge the article through the opening 71. Intermediate its ends the chute 70 is provided with a trap door 74 hinged at 75 and spring urged normally to a closing position against a downwardly facing shoulder 76. The article dropping through the upper end of the chute 70 by gravity and hitting against the closure 74 will open the latter to permit discharge through the opening 71. It is readily apparent that this trap door 74 prevents loss of refrigeration, and additionally prevents unauthorized entrance to the refrigerating compartment.

The front wall 25 of the cabinet is provided with an opening therein to removably receive the coin control unit E in a manner which has been more specifically set forth in a co-pending application, Serial No. 96,867 filed August 19, 1936, bearing Patent Number 2,144,568 granted January 17, 1939. This coin control unit will be more specifically referred to hereinafter.

The tank 35 is bodily removable from the compartment 32 together with all of the vending machine operating mechanism. It is provided with a reinforcing ring 80 about the upper peripheral margin thereof upon which an overhead inverted U-shaped bracket 81 is mounted; the latter having depending legs 82 and 83 which are respectively attached as shown at 84 and 85 in Figures 2 and 17 of the drawings. This bracket is a metal casting and centrally supports the bearing for the upper end of the rotatable carrier C.

Figure 8:
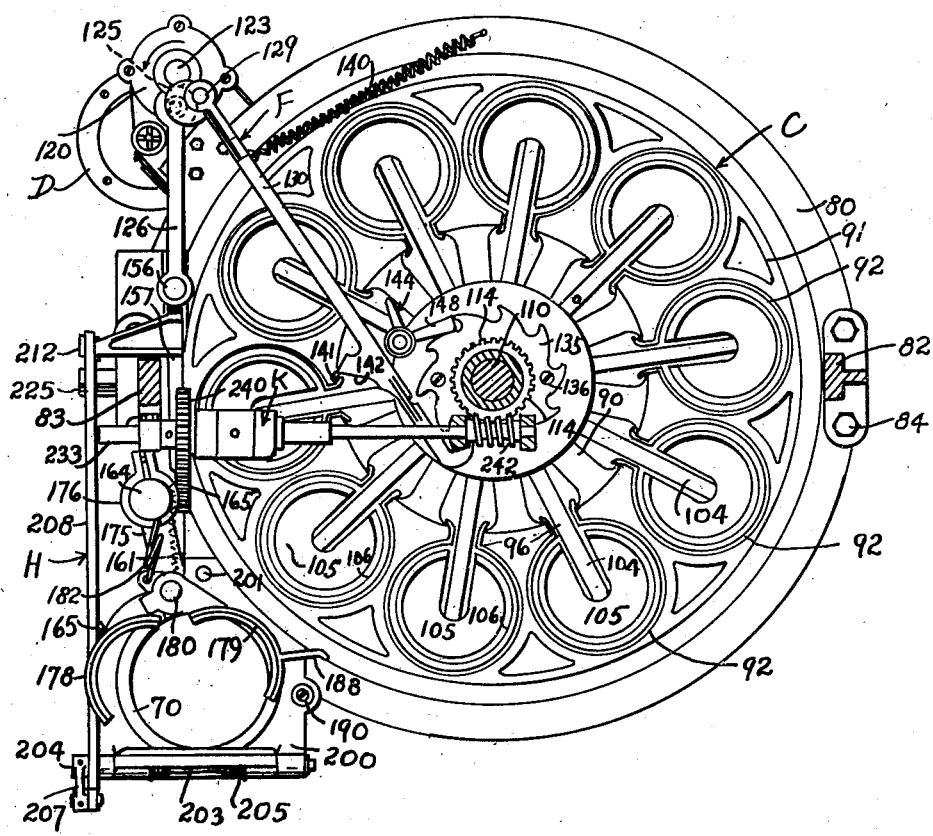
Figure 8 is a plan view similar to Figure 6, but with the carrier actuating mechanism and the ejecting or dispensing mechanism in position immediately after the release and discharge of a refrigerated article (not shown) into the dispensing chute.
Figure 9:
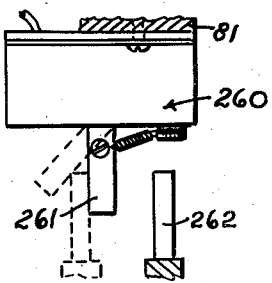
Figure 9 is a fragmentary view of a cut-out switch which is actuated when the machine is empty to prevent an operator from losing a coin in an attempt to operate the machine.

Referring to the carrier construction C, the same includes upper and lower guide supporting spiders or members 87 and 88, which are of substantially the same construction, each including a disc-like central hub portion 89 with arms uniformly divergently extending away therefrom; said arms being designated at 90 and terminating in an annular connecting portion 91, horizontally disposed; said portion 91 having uniformly arranged openings therein with their centers lying in a circle struck from the center of the disc 89. These openings of the upper and lower spiders 87 and 88 support the upper and lower ends of guide tubes or columns 92, of sheet metal, wherein the articles to be dispensed are maintained in stacked columnar relation, supported at their lower ends upon the elevator 97. These guide tubes 92 are vertically slotted at 96, and flanged at opposite sides of said slots into engaging relation with the spider arms 90, as is shown in Figure 8 of the drawings and elsewhere. The top of the rotatable carrier terminates at about the same level as the entrance to the dispensing chute 70, to permit the refrigerated articles as they are elevated through the top of the guide tubes 92 to be successively dispensed by means to be subsequently described, into the chute 70.

The rotatable carrier C is provided with a step bearing 99 which is mounted upon the bottom wall of the tank 35; the hub portion 89 of the lower spider or end 88 of the carrier rotatably bearing on this step bearing 99; the step bearing being provided with a suitable shoulder to maintain the lowermost portion of the spider or lower carrier end 88 above the bottom slate wall of the tank 35, to prevent any moisture or water which may collect in the bottom of the tank from surrounding the point on which the spider 88 bears, so that freezing of the carrier to the step bearing is prevented. This is an important feature, as indeed many types of refrigerated vending machines are thoroughly impractical due to lack of consideration of freezing temperatures, which very often cause relatively movable parts to freeze together, rendering the mechanism inoperative. In the present invention these features have been thoroughly considered and tested.

A spirally grooved removable shaft 100 is axially positioned in the carrier construction, having a lower socketed end supported upon the step bearing 99. The hub portion 89 of the upper spider 87 is provided with a central opening 101, with the upper end of the spirally grooved shaft 100 extending therethrough, as shown in Figure 17 of the drawings. This shaft 100 at its upper end is provided with adjustable means 102 for keying the same rigid with the supporting bracket 81, so as to prevent its rotation, except under circumstances to be subsequently described.

Figure 13:
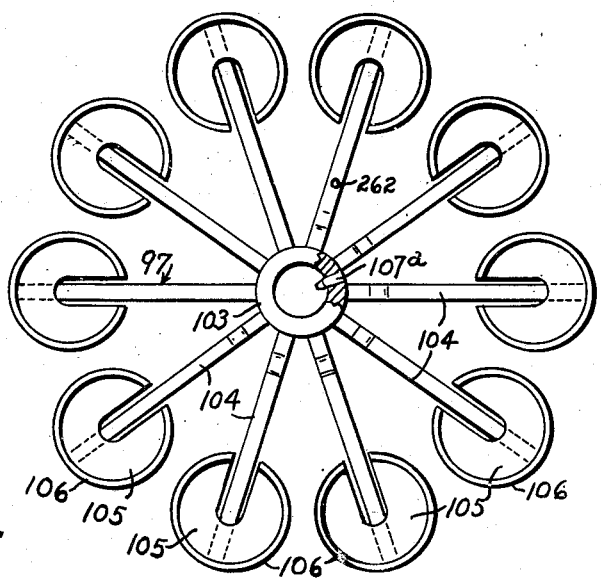
Figure 13 is a plan view of an elevator upon which the stacked columns of ice-cream cups or other articles are mounted in the carrier.
Figure 14:
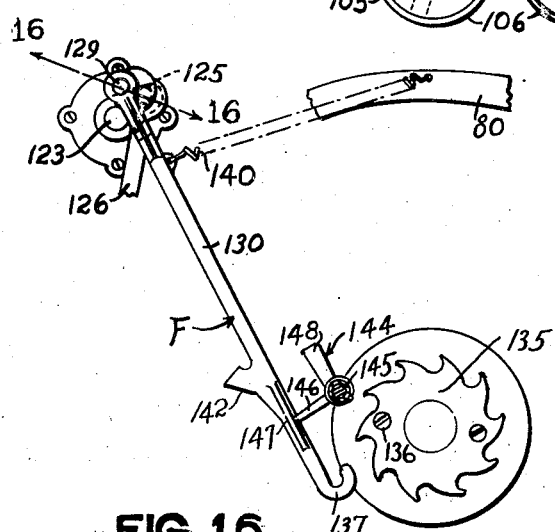
Figure 14 is a fragmentary view of the motor controlled carrier ratchet actuating arm, showing it in an inoperative position.

The elevator 97 includes a hub portion 103 apertured for slidable mounting upon the shaft 100. It furthermore includes a plurality of radially extending arms 104, best shown in Figure 13 of the drawings, each of which at the free end thereof supports a platform 105 provided with a peripheral edge 106 thereabout. These arms 104 radially extend through the slots 96 in the guide tubes 92; the platforms 105 being positioned in the guide tubes, and each intended to support thereon a stack or column of articles 107, which in the specific example shown are of cup-shaped formation. They may or may not be nested. The hub 103, as shown in Figure 13 of the drawings, is provided with a pin 107ª which radially projects into the spiral groove 108 provided in the outer periphery of the shaft 100, so that as an incident of rotation of the carrier C the elevator 97 will be fed upwardly or downwardly. During normal dispensing operation the elevator 97 will of course be moved upwardly in order to permit the uppermost of the cartons from the columns to be dispensed from successive columns as the carrier C is intermittently brought to dispensing position. An important feature of the elevator 97 is the fact that the platforms 105 are vertically offset in successively stepped relation so that the uppermost carton of each column, as the column approaches the dispensing chute, will be moved to a proper position from which the means G may grasp and eject the carton.

It can quite readily be appreciated that the shaft 100 will have to be removable, in order to substitute other shafts from time to time having spiral grooves 108 with a desired pitch, since the pitch must proportionately correspond with the height of the carton or article to be dispensed; it being intended that for one complete revolution of the carrier C the elevator 97 will be elevated for the effective height of one of the articles, if it is intended to dispense a single article at a time from the machine.

As to the manner of mounting the upper end of the shaft 100, the means 102 includes a sleeve or collar 108ª provided with a passageway 109 therein within which the upper reduced end 110 of the shaft 100 rotatably bears. A removable bushing 111 is mounted in fixed relation within an opening 112 in the bracket arm 81, as shown in Figure 17, by means of screws 113. The sleeve 108ª bears in this bushing 111, extending upwardly thereabove and downwardly therebelow. The lower portion of the sleeve is provided with a worm gear 114, which is part of the compensating means K. It is held normally against rotation by the means K until there is some inequality in the height of the cartons which necessitates an angular movement of the shaft 100 in order to compensate for such inequality. Indeed, except for such inequality in height of the carton, and if the pitch of the spiral groove in the shaft is properly proportioned with respect to the effective height of the individual articles or cartons, the shaft 100 could be mounted so as never to rotate. The upper end of the sleeve 108ª is provided with a series of radial slots 116 therein, shown in Figures 4 and 6 of the drawings, into which a pivoted detent 117 may selectively be p'aced to key the shaft 100 with the sleeve 108ª. This pivoted detent 117 is pivoted by a pin 118 in the upper kerfed end of the shaft 100, as shown in Figure 17, and therefrom it may be swung upwardly, as shown by the dotted lines in Figure 17, to rotate the shaft 100 entirely independent of the compensating means K. The keyed position is shown in full lines in Figure 17, and under such circumstances of course the shaft 100 is keyed with the sleeve 108ª and moves therewith.

Figure 15:
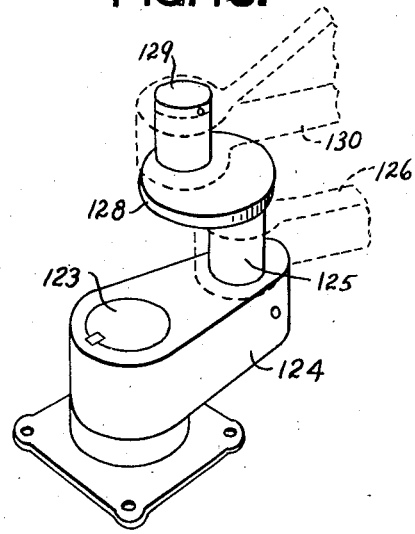
Figure 15 is a perspective view showing the cams or eccentrics mounted upon the motor controlled shaft of the vending machine in order to control such features of the invention as the intermittent carrier advancing means; the ejecting or dispensing means; dispensing chute closure means, and article size compensating means.
Figure 16:
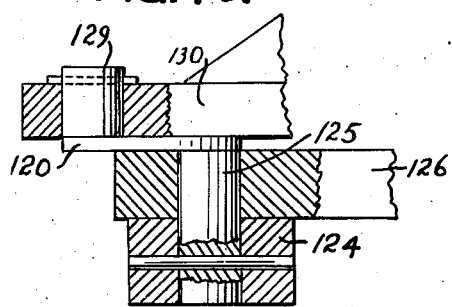
Figure 16 is a sectional view taken through the eccentrics shown in Figure 15, substantially on the line 16—16 of Figure 14.

The motor D may be relatively small, and if desired it may be mounted in an insulated or partially insulated casing. It is attached by suitable bracket means upon the exterior of the tank 35 near the upper end of the latter, in the position shown in Figure 5. It has gear reducing mechanism 120 driven by the shaft of the motor; the gear reduction mechanism 120 having its casing attached by suitable bolt means 121, shown in Figure 6 of the drawings, to the reinforcing ring 80 of the tank. The gear reduction mechanism is provided with a driven shaft 123, shown best in Figure 15 of the drawings, which is slowly rotated by the motor through the gear reduction mechanism at a proper operating speed ratio. The shaft 123 is mounted upon a vertical axis at about a location level with the top of the tank 35, and it is provided with a laterally extending arm 124 having an eccentric shaft 125 positioned upon a vertical axis to which a connecting arm 126 is rotatably attached; the arm 126 being the means which operatively connects the means G, H, and K with the motor D. Further referring to Figure 15 it will be noted that the top of the eccentric 125 is provided with a laterally extending portion 128 which is shown to be of disc-shaped formation, but which does not necessarily have to be of this shape. It supports a second eccentric 129 mounted upon a vertical axis offset from the axes of both the shafts 123 and 125 and rotatably receives thereon a pawl arm 130 comprising part of the means F to be subsequently described. It is quite apparent that during rotation of the shaft 123 the arm 124 will be rotated for moving the eccentrics 125 and 129 through predetermined circles of definite diameters in order to oscillate the connecting rod 126 and the pawl arm 130, for actuating mechanism to be hereinafter described in detail.

Figure 6:
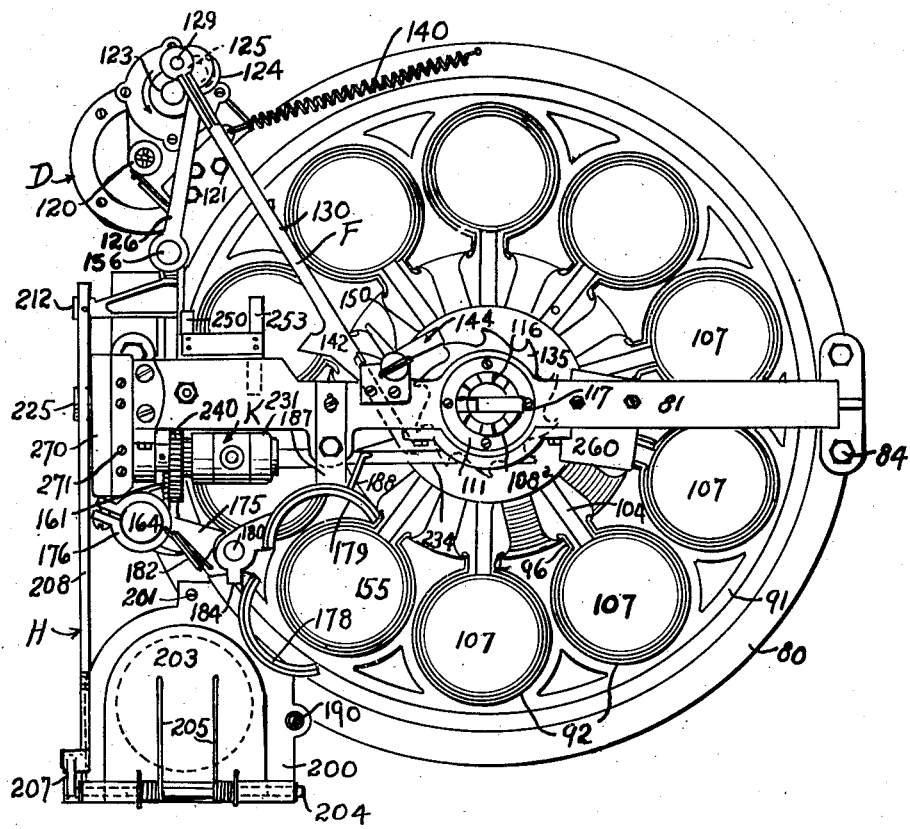
Figure 6 is a plan view of the carrier of the vending machine, showing the motor with the carrier actuating mechanism and dispensing or ejecting mechanism in the rest position.

Referring to the means F connected with the motor to intermittently advance the rotary carrier, such means includes a ratchet wheel 135 rigidly but detachably keyed at 136 upon the top spider 87 of the carrier C, as shown in Figure 17. The pawl arm 130 is intended to actuate this ratchet wheel 135, having a hook end 137 thereon which during oscillation of the arm 130 engages the teeth of the ratchet wheel 135 to intermittently advance the carrier C. A spring 140 normally urges the arm 130 at its hook end against the teeth of the ratchet wheel. Since under some circumstances the hook end of the pawl 130 may not engage the teeth of the ratchet wheel, due to spring action alone, I have provided a pin 141 mounted upon the bracket arm 81 and depending therefrom, against which a cam edge 142 of the pawl arm is intended to hit in order to deflect the pawl arm into position for engaging the teeth of the ratchet wheel. This only occurs in event the spring 140 is frosted to such an extent as not to act normally. During normal action the edge 142 does not hit the pin 141. The starting position of the means F is shown in Figure 6 of the drawings, and successive positions are shown in Figures 4 and 8 respectively. A bell crank detent 144 is pivoted at 145, on the bracket 81. It is provided with an arm 146 which may be moved to engage a portion 147 of the pawl arm 130 to hold the same inactive. It is provided with another arm 148 normally urged by a spiral spring 149, shown best in Figure 17, into position to act as a dog against the teeth of the ratchet wheel 135, as shown in Figures 4 and 8 of the drawings, to prevent any counter movement of the carrier after the cup intended next to be dispensed has been advanced to the position in which the means G may engage it and move it to the dispensing chute. This pivot 145 is provided with a finger engaging handle 150 on the top thereof to facilitate movement of the detent 144 to either of the positions above described.

Referring to the ejecting means G, the cups are elevated as above described and the uppermost of the cups in each column are elevated out of the respective guide tubes in which positioned and successively brought into position designated by the numeral 155 in Figure 6 of the drawings, and from which position the carrier is moved slightly and the gripping tongs closed to engage the carton and thereafter move it laterally and drop it into the chute 70.

The eccentric attached connecting rod 126 is provided with a forked end to which is pivoted at 156 an end of a slidable rack bar 157. This rack bar is slidably mounted upon a base 158 which is rigidly attached on the supporting ring 80 at the top of the tank 35, as shown in Figures 11 and 17 of the drawings. A flange on the base 158 maintains the bar 157 in position for rectilinear movement as the connecting rod 126 is oscillated through connection with the eccentric of the driven shaft 123 above described. This rack 157 is provided with an upwardly facing series of rack teeth 160 intended to actuate an operating pinion 240 of the compensating means K to be subsequently described. It is also provided with a laterial series of rack teeth 161, shown in dotted lines in Figure 8 of the drawings, meshing with the teeth of a pinion 162 keyed or otherwise fixed upon the lower end of a vertical sleeve 163 comprising part of the means 164 by which the carton or article gripping and ejecting tongs 165 are mounted to enable them to vertically and laterally move the carton to a dispensing position.

The sleeve 163 is rotatably mounted upon an upright shaft 167 which is keyed at 168 upon the portion 80 of the tank, as shown in Figure 11 of the drawings, and in a non-rotatable position. The sleeve 163 is provided with a laterally extending pin 169, as shown in Figure 11 which operates in a spiral slot 170 provided in the lower portion of a sleeve 171. This slot 170 extends through 90° about the sleeve 171, and through the pin connection 169 therein the said sleeve 171 is elevated and lowered and moved thru an arc sufficient to move the tongs back and forth between the extreme positions shown in Figures 6 and 8 of the drawings. A spiral spring 172 is provided on the upper end of the shaft 167, having an end 173 connected thereto; the opposite end of the spring being keyed at 174 to the sleeve 171. This spring is tensioned so that it normally moves the sleeve 171 to a position which will place the pin 169 in the bottom of the spiral slot 170. Relative rotation of the sleeve 171 on the sleeve 163 from the position shown in Figure 11 to the position shown in Figure 12 will further expand the spring 172.

The tong construction 165 preferably comprises an arm 175 detachably clamped at 176 in keyed relation upon the lower end of the oscillating sleeve 171. This arm 175 at its outer end is provided with a fixed segment 178 and a pivoted segment 179 which is pivoted at 180. The segments 178 and 179 are complementary and may be moved into carton clamping position as shown in Figure 4, or may be relatively moved away from each other into carton receiving position. A spring 182 is so placed upon the gripping tong mechanism, between the portion 176 of the tongs and the movable segment 179 that it will exert its force to maintain the segments 178 and 179 either in open article receiving position as shown in Figure 6, or in carton clamping position, as shown in Figure 4. In the former position a lug 184 engages against a stop portion of the fixed segment 178, as shown in Figure 6, and in the closed position of the tong segments the same will abut against each other at their ends adjacent the pivot 180, as shown in Figure 4. The spring 182 acts to snap the tong segments either open or closed, as soon as the end connected to the movable tong segment has passed a dead center line drawn between the axis of the pivot 180 and the other connection of the spring 182. The closing of the tong segments 178 and 179 upon a carton into position to be received thereby, is facilitated by engagement of the movable segment 179 against a depending finger 187, mounted upon the overhead supporting bar 81, as shown in Figures 4 and 11 of the drawings. The movement of the tong segments to carton releasing position is facilitated by engagement of an extension 188 upon the movable segment 179 with an upstanding pin 190 vertically positioned as shown in Figure 5 adjacent the entrance to the dispensing chute 70 in position to engage the arm 188, as shown in the dotted lines in Figure 10 of the drawings, to cause the spring of the tongs to snap the tong segments open, as shown in Figure 8, to release a carton formerly held thereby and drop it into the dispensing chute.

The operating action of the ejecting means G is of course timed with advance of the carrier by the means F. The starting position is shown in Figure 6, wherein it is shown that the tongs are open ready to receive the carton 155 shown in that figure. The motor driven shaft 123 rotates in the direction shown by the arrows. It will be noted that the eccentric 129 at this starting position is located so that the pawl 130 will move the ratchet wheel 135 slightly before dead center position is passed. This rotates the carrier from the position shown in Figure 6 for a slight angular movement sufficient to move the carton 155 against the gripping tongs, in order to dislodge it from the carton therebelow upon which it may rest, and to which it may be frozen by any moisture which may have collected to cause such adherence. Also, going back to the starting position shown in Figure 6, it will be noted that the tong arm 179 is engaged against the finger 187. This position was assumed while the preceding dispensing action was still in progress, as will be noted from the position of the eccentric 125. The eccentric 125 in the preceding operation pulled the rack bar 157, and through its rack engagement with the pinion 162 swung the tong arm from the position shown in Figure 8 to the position shown in Figure 6. During the preceding operation the tong arm 179 engaged the finger 187 before completion of said preceding dispensing operation. During this portion of the preceding operation the sleeve 171 was elevated, as shown in Figure 11, and in this position the pin 169 of course is positioned in the lower end of the spiral slot 170 of the sleeve 171. Towards the end of the preceding operation the segment 179 engaged the finger 187 and stopped further movement of the tong arm 175. However, the rack through engagement with the pinion 162 continued to rotate the sleeve 163 causing the sleeve 171 to be vertically lowered upon the sleeve 163 to a position where the pin 169 was placed about midway between the ends of the slot 170, at the time the preceding cycle of operation was completed. In the starting position shown in Figure 6, the eccentric 125 will rotate to pull the rack bar 157 in order to complete the lowering of the sleeve 171 to the position shown in Figure 12. This occurs just at about the time that the carrier C is moved to hit the carton 155 against the open tongs. Thereafter the rack bar 157 continues to move towards the motor, and inasmuch as the pin 169 has reached the top end of the slot 170, in the position shown in Figure 12, it is quite evident that continued retraction of the bar 157 will cause the tong arm 175 to move, which will move the segment 178 towards the carton 155. Since the segment 179 cannot move, as it is engaged against the finger 187 the tong arm 175 will move until the spring 182 snaps past dead center, and at which time the tong arms 178 and 179 will grip the carton 155 and forcefully giving it a lateral shove to completely dislodge it from the carton therebelow, as can readily be understood by observing Figures 4 and 10, wherein the gripping position of the tongs is illustrated, showing its eccentricity with respect to the axis of the guide-column in which the carton is positioned. It will be noted from Figure 4 that the axis of the eccentric shaft 125 of the arm 124 is on line with the rectilinear movement of the rack bar, and as the motor continues to operate, the rack bar 157 will be moved forwardly in the direction of the dispensing chute. This rotates the sleeve 163 moving the pin 169. Since the spring 172 will hold the tongs against the finger 187 the pin 169 riding along the slot 170 will raise the sleeve 171 to the position shown in Figure 11. This operation will raise the carton 155 out of the upper end of the guide tube and out of its nested relation with the carton therebelow, to a suspended position from which it may be swung laterally by the tongs to a location over the dispensing chute, as shown by the dotted lines in Figure 10 of the drawings. This lateral movement of the tong arm 175 is accomplished after the pin 169 has reached the bottom of the slot 170, as can readily be understood. At the moment that the tongs are moved to position the carton over the entrance to the dispensing chute, the extension 188 on the movable tong 179 will engage the pin 190, as shown in the dotted lines in Figure 10 of the drawings, and continued movement of the tongs over the dispensing chute will cause the tong arms to open after the spring 182 has passed the dead center position. The snapping open of the tong segments releases the carton and it drops into the entrance of the dispensing chute 70, as can quite readily be understood.

Figure 7:
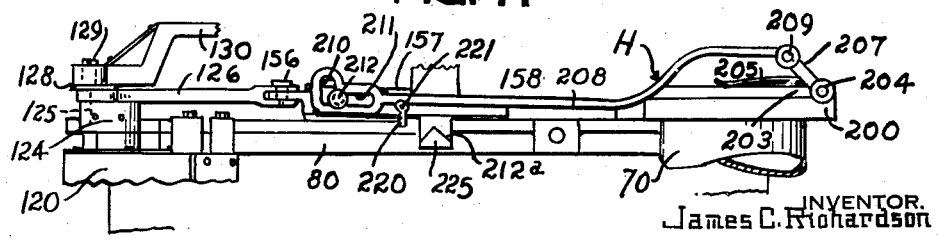
Figure 7 is a side elevation of the motor controlled means for actuating the dispensing chute closure.

Referring to the motor controlled closure means H, the same cooperates with the means F and G to permit the article to be dispensed from the machine without appreciable loss of refrigeration. The upper end of the dispensing chute is provided with an insulation plate or wall 200 which has an opening therethrough to the dispensing chute 70. This wall 200 is affixed at 201 to the stationary top 80 of the tank. It has a closure 203 pivoted thereon at 204 and spring urged at 205 to a normally closed position. As shown in Figure 7 of the drawings this closure 203, on the pivot 204 to which it is keyed, is provided with a crank arm 207. A connecting rod or member 208 is pivoted at 209 to the end of the crank arm 207. At its opposite end the rod or member 208 is provided with a right angled slot including an upstanding vertical portion 210 and a horizontal portion 211. A pin 212 fixedly connected with the rack bar 157 extends into this slotted arrangement of the bar 208. As the eccentric 125 draws the rack bar 157 towards the motor the pin 212 will be moved rearwardly until in a position at the lower end of the vertical slot 210, at which time the slotted end of the bar 208 will drop to latch the pin 212 in the upper end of the slot 210. This occurs at the time that the carton 155 is grasped by the tong arms, after the machine has been set into operation. As the tong arms are swung to carry the carton laterally to a position over the dispensing chute, the rack 157 moving forwardly will push the bar 208 forwardly, and through its connection with the crank arm 207 will open the closure 203, to permit the article to be dropped into the dispensing chute 70. This dispensing position of parts is shown in Figure 8 of the drawings. Upon the return movement of the tongs after the carton has been dispensed, to place the mechanism in the reset position shown in Figure 6, as the rack bar 157 is moved towards the motor, a pivoted trip lever 220, shown in Figure 7 of the drawings, which is pivoted at 221 on the bar 208 will ride into engagement with the sloping cam edge 212ᵃ of a cam 225 which is fixed upon the stationary part of the machine. This action will elevate the slotted end of the bar or member 208, removing the pin 212 from the upper end of the slot 210, and at which time the spring 205 will shut the closure 203; the pin 212 now riding along the slot 211. This position is maintained until the machine is again operated. It will be noted that the trip lever 220 will pivot in one direction only, so that during forward movement of the lever 208 to open the closure the lever 220 will engage against the opposite sloping face of the cam 225, but only to pivot at 221, which will not raise the bar 208.

Referring to the compensating means K which will enable the stacked articles to be properly brought to the dispensing position to compensate for variation between height of the cartons and pitch of the groove 108, the same includes a differential mechanism 230 consisting of a casing 231, as shown in Figure 17, having a ratchet wheel 232 keyed at one end thereof. Aligning shaft portions 233 and 234 of the differential are provided with suitable bevel gears 235 and 236 respectively, meshing with the usual bevel differential gears 237, as shown in Figure 17. The shaft 233 rotatably bears in the bracket arm 83 above mentioned and adjacent the ratchet wheel 232 it is provided with a gear 240 meshing with the bar portion 160 of the rack 157, as shown in Figure 17. The other differential shaft 234 is provided with a worm 242, as shown in Figure 8, which meshes with the worm gear 114 above described.

Figure 23:
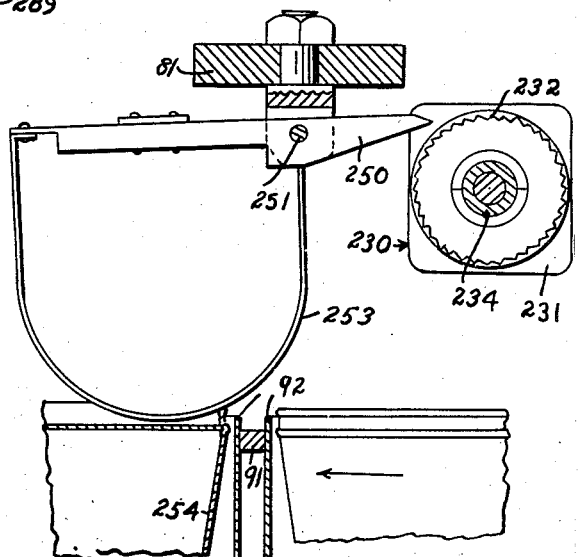
Figure 23 is a fragmentary view of certain details of the compensating means by means of which variations in the height of articles dispensed by the vending machine may be made to adjust the position of the elevator in order to properly position the articles with respect to the ejecting means.

During normal action of the operating mechanism the differential K plays no part whatsoever in adjusting the height of the stacked articles in order to properly bring a carton into position. Under such circumstances the gear 240 is oscillated back and forth by engagement with the rack bar 160, and the shaft 233 of course oscillates therewith; the differential gearing taking up the motion and oscillating the differential housing 231 back and forth; the shaft 234 remaining stationary. However, by referring to Figure 23 it will be seen that a detent 250 is pivoted at 251 upon the bottom of the overhead bracket 81. This detent 250 at one side of its pivot is provided with a U-shaped carton engaging spring 253 which is preferably resilient. If the cartons, one of which is designated at 254, in Figure 23, are elevated too fast, or if the height thereof is such that they will eventually not be brought into proper dispensing position with the gripping tongs, the upper edges of the cartons will engage the spring 253, as will be noted from Figure 23, tipping the detent 250 to engage it with the ratchet wheel 232. This action will prevent rotation of the ratchet wheel in one direction, so that actuation of the gear 240 by the rack bar 160 will rotate the worm 242, shown in Figure 8 of the drawings, for imparting slight angular movement to the worm gear 114. This will angularly move the shaft 100, shown in Figure 17, since such shaft is keyed at 117 to the sleeve on which the worm gear 114 is positioned; moving the shaft 100 angularly to permit the elevator pin 107 to slide downwardly slightly in the spiral groove 108; lowering the cartons slightly. Since under some circumstances the cartons may be of a height which will not proportionately correspond with the pitch of the groove in the spiral shaft 100 it can readily be understood that this compensating means K plays a very important part in properly bringing the cartons to a dispensing position.

From Figure 2 it will be noted that a cut-out switch 260 is mounted upon the bracket 81, the same including a depending pin 261 in position to be engaged by a pin 262 which is mounted upon one of the arms 104 of the elevator, as shown in Figure 13; this pin 262 rising to engage the switch arm 261 and throw out the switch 260 when the machine is empty. This switch 260 corresponds to the switch 190 set forth in a copending application, Serial No. 96,867 filed August 19, 1936, bearing Patent Number 2,144,568 granted January 17, 1939, describing the coin control mechanism for the improved machine A.

As will be noted from Figures 17 to 20 of the drawings, and elsewhere, the shaft 233 is provided with a switch arm 265 which oscillates therewith; the same having a pair of contact arms 267 and 268 thereon, relatively insulated from each other. An insulation block mounting is provided with an arcuate slot within which these switch arms operate; said insulation block including complementary portions 270 and 271 which are provided with contacts in the facing surfaces thereof. The switch arms 267 and 268 are each of U-shaped construction, each providing a pair of resilient arms normally urged away from each other. For these portions of the switch arm 267 the insulation block parts 270 and 271 are provided with a pair of contacts 273 and 274 which are engaged by the contact 267 to bridge a circuit therethrough. The complementary parts of the insulation support are also provided with a pair of plate contacts 276 and 277 in position to be engaged by the opposite spring arms of the contact 268. This motor controlled switch mechanism has been described in the co-pending application, Serial No. 96,867 filed August 19, 1936, bearing Patent Number 2,144,568 granted January 17, 1939 above described. In that application the switch arms 144 and 167 correspond to the switch arms 267 and 268 of the present application; the contacts 141 and 145 correspond to the contact plates 273 and 274 of the present application, and the contacts 157 of the said co-pending application correspond to the contact plates 276 and 277 of the present application.

Figure 22:
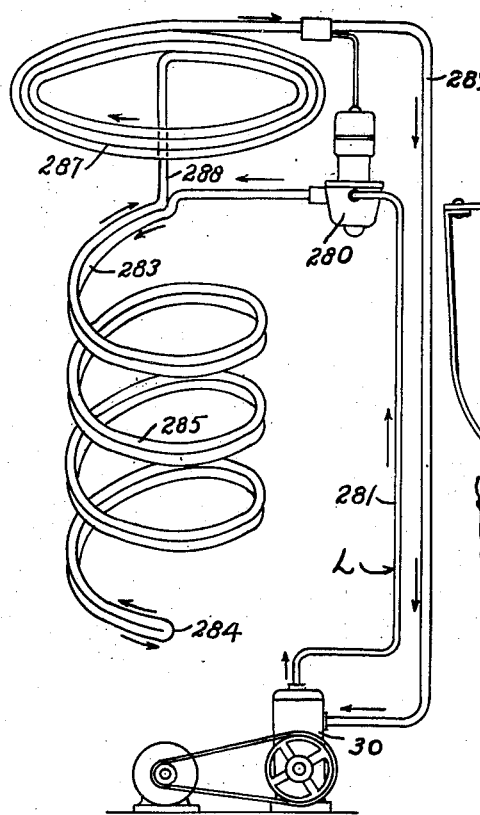
Figure 22 is a diagrammatic showing of the coil arrangement of the refrigerating means of the vending machine.

Referring to the refrigeration means L, the same includes the refrigeration unit 30 heretofore referred to. In the upper portion of the refrigerated compartment is an expansion valve 280, shown in Figures 2 and 4 of the drawings, and in the diagrammatic refrigeration diagram in Figure 22. The outgoing line 281 leads from the unit 30 through the expansion valve 280; expanding the refrigeration medium into a spiral coil 283 which surrounds the carrier C, within the tank 35, as shown in Figure 2 of the drawings; the coil 283 being a double coil so that the refrigeration medium is first directed downwardly through the coil 283 towards the lower end of the carrier, and at 284 the refrigerant is returned in parallelism with the coil 283, through a return coil 285. These coils 283 and 285 are located about the carrier C, below the top of the tank 35 and above the bottom of the tank 35 for an appreciable distance, sufficient to give the most efficient refrigeration for the articles being vended. A preferably flat coil 287 is provided in the upper portion of the refrigeration compartment, preferably immediately below the refill opening 44 to the vending machine casing; the convolutions of the coils 287 preferably lying in the same plane, as shown in Figures 5 and 22. The refrigerant enters the inner portion of the coil 287 thru a line 288 leading from the coil 285 and next returns through a line 289 to the unit 30. The importance of the coil 287 cannot be exaggerated, since thereon the moisture in the refrigeration compartment is collected and deposited before the moisture has an opportunity to settle on the coils 283 and 285, thus preventing the latter coils from becoming frosted to any appreciable extent. This means that the machine will operate for long periods of time without requiring defrosting. In a vending machine this is very important, requiring but little attention upon the part of the owner or concessionaire of the machine.

The facility with which the elevator 97 may be elevated and lowered is noted, since in order to quickly accomplish the elevation or lowering it is merely necessary to throw the key 117 to the dotted position shown in Figure 17 and rotate the shaft 100 thereby.

The pawl arm 130 of course takes only one tooth of the ratchet wheel 135 at each dispensing operation.

Figure 21:
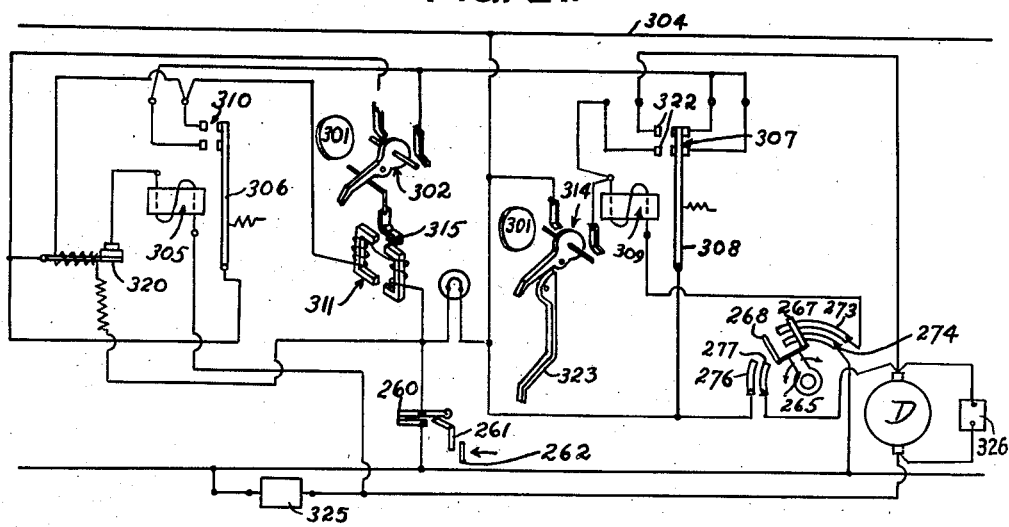
Figure 21 is a wiring diagram showing the vending machine operating motor and its coin controlled electric circuit which has been made the subject matter of a co-pending application, Ser. No. 96,867 filed August 19, 1936 bearing Patent Number 2,144,568 granted January 17, 1939.

Referring to the coin control wiring diagram of Figure 21, as above mentioned the same has been described in detail in a co-pending application, Serial No. 96,867 filed August 19, 1936 bearing Patent Number 2,144,568 granted January 17, 1939. It will be briefly referred to herein. The operator desiring to receive a packaged article from the vending machine will drop a proper coin into the coin entrance chute 300 of the coin control mechanism E, as shown in Figure 1. The coin 301, shown in Figure 21 will close a switch mechanism 302 directing current from a circuit 304 through a relay 305 for attracting the armature 306 thereof. The circuit in order to reach the relay 305 must travel through a normally closed switch 307 in the circuit. This switch 307 includes as a part thereof an armature 308 which is part of a relay 309. Closing of the circuit through the relay 305 will close a normally open switch 310 and direct the current through electro-magnetic means 311 of a suitable detector unit. The circuit completed through this means 311 will enable the coin 301 which passes therethrough to be detected and either ejected from the coin control mechanism at 312, shown in Figure 1 of the drawings, or permitted to pass for further operation of the coin control and vending machine operating mechanism. If the coin is proper it will fall by gravity and close a second switch 314, closing a circuit through the second relay 309 above mentioned. Before this happens, however, the circuit through the relay 305 as above completed by the switch 305 is broken so far as the switch 302 is concerned, since the switch 302 is opened by an armature 315 attracted upon energization of the detector means 311. However, the winding of the relay 305 is still energized through a holding circuit which includes a thermostatically controlled switch 320. Closing the circuit through the relay 309 will of course move the armature 308 for opening the circuit through the switch 307. The armature 308 bridging a pair of contacts 322 will close a circuit through the motor D, setting the switch arm 265 in motion. It will be noted that at the start of the operation, the switch arm 267 bridges the contacts 273 and 274, to enable a circuit to be completed through the relay 309. The good coin after closing the switch 314 drops upon a trip lever 323 for opening the switch 314, but the relay 309 still remains energized through the holding circuit completed after the armature 308 moves into engagement with the contacts 322. The motor controlled switch arm 265 will move until the contact arm 268 bridges the contacts 276 and 277, which directs the current into the motor D. At this time the arm 267 has moved out of engagement with the contacts 273 and 274, breaking the circuit through the relay 309, and the armature 308 thereof will spring back to close the switch 307 for the next operation. The switch arm 265 oscillates across the contacts 276 and 277 and returns to the position shown in Figure 21 for the next coin operation, as has been described in the above co-pending application, Serial No. 96,867 filed August 19, 1936 bearing Patent Number 2,144,568 granted January 17, 1939. In the circuit a normally closed circuit making and breaking switch 325 is provided in one of the main lines of the circuit 304, intended to open through placing of an overload upon the motor D. If desired a magnetic counter 326 may be connected in operating circuit with the motor D.

Various changes in the shape, size, and arrangement of parts may be made to the form of invention herein shown and described, without departing from the spirit of the invention or the scope of the claims.

I claim:

1. In a vending machine construction the combination of a casing having a dispensing opening leading from a compartment therein, a rotary carrier construction mounted in said compartment including a spirally grooved vertical shaft, an elevator member having a hub provided with a slidable pin connection in the spiral groove of the shaft and a plurality of outstanding arms provided with a series of individual article stack supporting platforms surrounding said shaft, means to rotate the elevator about the shaft to elevate or lower the same and the stacks of articles therewith, means to dispense the articles from the stacks through the dispensing opening, and means normally holding the shaft stationary including means to rotate the same to a desired adjusted position for bringing the elevator to a desired level.

2. In a vending machine construction the combination of a casing having a dispensing opening leading from a compartment therein, a rotary carrier construction mounted in said compartment including a spirally grooved vertical shaft, an elevator member having a hub provided with a slidable pin connection in the spiral groove of the shaft and a plurality of outstanding arms provided with a series of individual article stack supporting platforms surrounding said shaft, means to rotate the elevator about the shaft to elevate or lower the same and the stacks of articles therewith, means to dispense the articles from the stacks through the dispensing opening, means normally holding the shaft stationary including means to rotate the same to a desired adjusted position for bringing the elevator to a desired level, said elevator platforms being arranged in successive vertically stepped relation.

3. In a vending machine the combination of a vending machine casing having a compartment provided with a dispensing opening leading therefrom, a stacked article carrier in the compartment, means to move the article carrier to successively bring articles into dispensing position adjacent the dispensing opening, and dispensing means including pivoted article gripping tongs, means to actuate said tongs to grip the topmost article as it is brought into position adjacent the dispensing opening, means to elevate said tongs to lift said article thus grasped off of the article therebelow, means to swing said lifted article through an arc to a position adjacent to said dispensing opening, and means to open said tongs and move the article thus released into discharge position with respect to the dispensing opening.

4. In vending mechanism the combination of dispensing means including an upright shaft, an oscillative sleeve mounted on the shaft, means to oscillate the sleeve through a predetermined arc of oscillation, a second sleeve mounted upon the first mentioned sleeve having a spiral slot therein of predetermined length, a pin on the first sleeve having a slidable extension in said spiral slot, an expansible spring normally keying the shaft with the second sleeve and urging the shaft in one direction, and an article dispensing member on the second sleeve movable therewith through a predetermined arc of movement and lifted thereby as the second sleeve is slid axially along the first mentioned sleeve as an incident of oscillation of said first mentioned sleeve.

5. In a vending machine the combination of a casing having a compartment therein and a dispensing opening leading therefrom, a movable article supporting carrier in the casing, means to move the carrier to bring the articles supported thereby into position adjacent the dispensing opening, dispensing means for moving the articles from such position into dispensing relation with said opening, and means actuated by irregularities in the size of the articles to be dispensed to vary the normal actuating movement of the carrier in order to properly bring the articles into position with respect to the dispensing means from which they may be most efficiently moved to the dispensing opening.

6. In a vending machine the combination of a casing having an article receiving compartment provided with a dispensing opening leading therefrom, a rotary carrier in the compartment having means to support a series of stacks of articles thereon, and means to elevate the stacks to successively bring the uppermost articles of the stacks into position adjacent the dispensing opening, means to dispense the articles through said opening as they are brought into position, and compensating means to bring the stacked articles to proper dispensing position notwithstanding variation in height of the articles.

7. In a vending machine the combination of a casing having an article receiving compartment therein and a dispensing opening leading therefrom, an external spirally grooved vertical shaft in said casing, elevating means having a slidable pin connection in the groove of said shaft and supporting a plurality of stacks of articles surrounding said shaft, dispensing means for dispensing the articles which are uppermost on the stacks as the stacks are successively brought into a dispensing relation with the dispensing means, and height compensating means operatively connected with said dispensing means and said spirally grooved shaft for angularly adjusting the position of the latter in order to bring the uppermost of the articles of the stacks into proper position with respect to the dispensing means, said compensating means having a controlling member in position to be operated upon by the uppermost articles of the stacks in order to adjust the angularity of the said shaft.

8. In a dispensing machine the combination of a rotary carrier construction including means to support articles in stacked relation and move the stacks axially to bring the articles into dispensing position, motor actuated dispensing means to move the articles from the stacks and dispense them, and means to compensate for the size of the articles in order to bring them into proper position with respect to the dispensing means including cooperatively actuated motor and article size controlling connections.

JAMES COLUMBUS RICHARDSON.